May 30, 1939.    A. BLONDEL    2,160,716
DIAPHRAGM FOR LENTICULATED FILMS
Original Filed June 8, 1935

INVENTOR.
André Blondel
BY
Stone, Boyden & Mack
ATTORNEYS.

Patented May 30, 1939

2,160,716

UNITED STATES PATENT OFFICE 2,160,716

DIAPHRAGM FOR LENTICULATED FILMS

André Blondel, Paris, France

Original application June 8, 1935, Serial No. 25,655. Divided and this application December 30, 1936, Serial No. 118,346. In France November 12, 1934

4 Claims. (Cl. 95—64)

This application is a division of the co-pending application Serial No. 25,655, filed June 8, 1935, entitled Process of colour cinematography on goffered films.

It is known that in handling lenticulated films for view-taking, copying or projecting purposes, any occultation of the light rays results in wrong distribution of colours and in objectionable tints.

The present invention has for its object to reduce this effect by using, in all objectives, diaphragms of a suitable form, obtained by an optical method in such a way that only the useful light rays are received by the original film and transmitted to the copy film, so that practically no partial light loss can occur.

Another object of the invention is to provide a method of obtaining the above diaphragms for a certain size of film and for a given set of view-taking, copying and projecting objectives.

Figure 1:
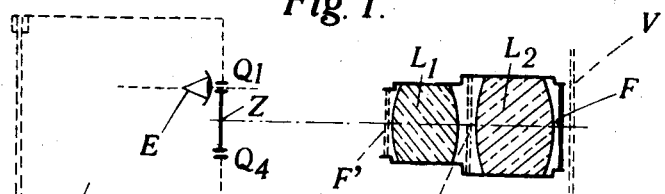
Figure 2:
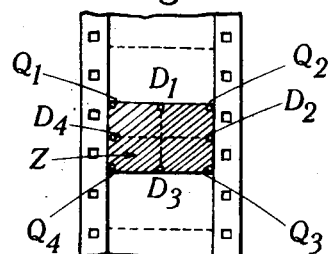
Figure 3:
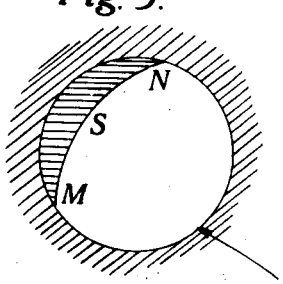
Figure 4:
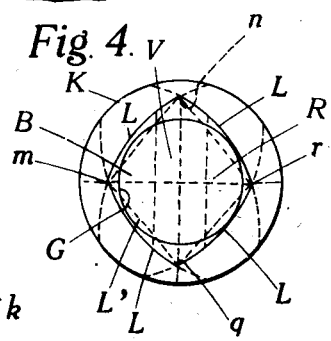
Figure 5:
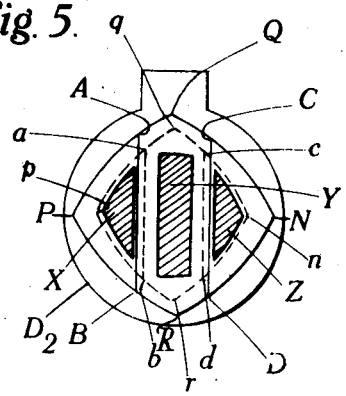

Further objects and advantages of the invention will become apparent from the following description with reference to the accompanying drawing in which:

Figs. 1 and 2 illustrate a method for determining the form of the filter to be used, Figs. 3 and 4 represent the effect of occultations by the metal parts of the objectives and the resulting form of the diaphragm, Fig. 5 represents a modified form of filter.

In the present specification, for the sake of simplicity, the term "stenopeic" means "projected by means of a small hole, but not by means of a lens".

According to the invention, the light beams traversing all the optical systems used in view-taking or in projecting lenticulated films are delimited to the useful part of the area of a diaphragm, the periphery of which is obtained, in the plane of the colour filter, by a stenopeic method, that is by conical projection of the mountings of the objectives used. This conical projection starts at the corners of the image to be recorded. The final form of the said diaphragm is obtained by tracing or by photography, as it will be more fully explained.

In the case of copying by projection, the light beams are delimited in the plane of symmetry of the copying optical systems or in the plane replacing it by means of a diaphragm, the periphery of which is obtained in the same plane by conical projection of the mountings of all the copying optical devices used, the said projection starting at the corners of the images carried by the films.

If the film is cylindrically lenticulated, the dimension of the view-taking filter perpendicular to the directions of the cylindrical lenticulations is equal to or less than the diagonal in the same direction of the periphery obtained by the stenopeic method as explained above.

If it is necessary to take into account the dimensions of several filters, the figures of the said filters are super-imposed and a diaphragm is chosen having an aperture inscribed in their common area, subdivided into parts for the component colours, suitably proportioned relatively to each other.

Experience shows, in fact, that the known methods of delimiting the view-taking or projecting filters are generally incorrect and consequently, give rise to vicious colour dominants. For example, it is wrong to employ in front of the aperture of the optical taking or projecting system a filter of the same aperture or reduced system a filter of the same height as the aperture to a rectangle of the same height as the aperture of the optical system. By so doing, there is a risk of losing light without completely avoiding the colour dominants.

On the contrary, one should endeavour to suppress the colour dominants while giving the filter the maximum possible aperture. This result may be obtained by experimentally tracing the periphery of the filter after having chosen its position either in the vicinity of one of the extreme lens surfaces of the optical system or in the interior of the latter between two lens surfaces.

The method consists in recording stenopeic images of the filter through small holes arranged on the periphery of a rectangular shield having the size of one image, and particularly at the corners thereof, then superimposing these images, eclipsed by the occultations, and tracing the periphery of the filter in accordance with the interior envelope of the eclipsed parts. The periphery obtained in this way is generally a lozenge with curved sides and possibly with rounded angles. It may be replaced by any inscribed periphery of the same centre. Its surface may then be divided into coloured zones giving quantities of coloured lights suitable for polychrome work.

If the film has cylindrical lenticulations it is possible, without causing any appreciable formation of vicious colour dominants, to provide for the dimension of the filter perpendicular to the direction of the lenticulations to be a size equal to or less than the diagonal in the same direction of the periphery in the form of a curvilinear lozenge as defined in the preceding paragraph.

These methods of tracing peripheries apply equally to the projecting filter or to the view-taking filter or to the diaphragm between the two systems of lenses for the copying of the film by projection.

Figs. 1 to 4 illustrate how to determine the form of a filter placed at F, F', or F'' in a given optical system $L_1 L_2$, by employing a black chamber or by direct observation. In front of the objective $L_1 L_2$ there is placed an element $Q_1 Q_4$ of a blackened film, which, as shown in Fig. 2, has the form of a rectangle $Q_1 Q_2 Q_3 Q_4$ the size of which corresponds to the size of an image Z of the film.

The film may be replaced by an opaque screen of the same dimensions; several small holes are provided on the periphery of the rectangle, particularly at the four corners, and at the extremities of the two diameters $D_1 D_3$ and $D_2 D_4$.

When the eye E is placed successively behind the four holes, for example behind the hole $Q_1$, there will be seen an illuminated circle eclipsed by a dark zone $mn$, (see Fig. 3), wherein the hatching represents the occultation caused by the mountings of the objective. All the eclipsed circles so obtained are combined in a single figure as illustrated in Fig. 4.

The interior periphery $m$, $n$, $r$, $q$, in full lines delimits the part of the filter which may be perceived from all the points of the rectangle $Q_1 Q_2 Q_3 Q_4$ of Fig. 2. Therefore, it is necessary to limit the useful surface of the filter for view-taking or for projection, or the useful surface of the diaphragm for copying to a periphery determined by the method just described. The periphery $mnrq$ defines the maximum aperture to be given to the filter. Any smaller filter having the same centre, such as the lozenge L' or the circle G, for example, also avoids the dominants but allows the light only to pass to a lesser degree.

In the case of cylindrical lenticulations, it is possible as is mentioned above, to limit one of the dimensions of the filter to the diagonal $mr$ at the maximum.

Another simpler and more direct method of determining the periphery of the filter consists in illuminating the small stenopeic holes of the film by a projector and producing an image, by the conical beams emitted by the holes, on a photographic plate placed at F or F'' as the case may be. This method is also applicable in the copying apparatus, by placing the photographic plate between the two lenses of the optical system and illuminating the holes of the two films.

It has been assumed in the foregoing that the filter for which the copying objective was calculated has the same form as that employed for view-taking, and that the plane of the virtual images corresponding to the plane in which these filters have to be supposed coincide in the plane of symmetry situated between the two copying objectives, which are generally used. For example, according to Fig. 5, the periphery PQNR may be provided for the imaginary filter reproducing the view-taking filter, enlarged or reduced by the effect of an auxiliary lens mounted near the original film. Another periphery $pqnr$, can correspond to an image of the projecting filter, also modified eventually by an auxiliary lens mounted before the copy film. On the other hand, the lines AB and CD separating the areas of different monochromes of one image do not coincide ordinarily with the corresponding lines $ab$ and $cd$ of the other image.

In order to make allowance for these differences and not to produce thereby troublesome colour distribution, there may be placed in the above mentioned diaphragm plane of the copying optical system, a shield $D_2$ as shown in Fig. 5 provided with windows X, Y, Z, etc. according to the number of monochromes, as large as possible and inscribed in the smallest of the common surfaces of the coloured zones, care being taken that the surfaces of these apertures are respectively proportional to the respective surfaces of the said zones in the view-taking filter or, more accurately, to the respective surfaces necessary for ensuring the correct distribution of the intensities of the colours.

To facilitate this result, it is of advantage generally to reduce the width of the central band of the view-taking filter, in order to permit the best adjustment of the windows, X, Y, Z.

The means described above may be used with advantage in connection with the auxiliary optical devices described and claimed in my copending application Serial No. 25,655, filed June 8, 1935. They may also be applied to any method of making copies by projection, and particularly to the method in which two slots or partial apertures are simultaneously displaced in front of the diaphragm of the copying objective and in front of the source of light, these slots or apertures being animated by a continuous or discontinuous movement. All the means hereinbefore described also apply to the method according to which the two diaphragms have corresponding apertures, in pairs, which are successively uncovered in pairs. It will be sufficient to provide the second of the above diaphragms with windows which are the images of the windows X, Y, Z of the first (that is the shield $D_2$ of Fig. 5) as formed by the optical means mounted between the two diaphragms.

I claim:

1. Method of making a diaphragm for inclusion in a system of color cinematography on lenticular films, which method comprises the steps of stenopeically projecting light through small apertures in the corners of an opaque screen which is arranged in the plane where a picture on a film is to be placed in normal operation of the system and which has the same dimensions as said picture, recording the contours of the luminous fields projected from said apertures in the plane where the diaphragm to be made is to be placed in normal operation of the system, and making a diaphragm of size corresponding to that of the area common to said luminous fields projected on said plane.

2. Method of making a diaphragm for inclusion in a system of color cinematography on lenticular films, which method comprises the steps of stenopeically projecting light through small apertures in the corners of an opaque screen which is arranged in the plane where a picture on a film is to be placed in normal operation of the system and which has the same dimensions as said picture, recording the contours of the luminous fields projected from said apertures in the plane where the diaphragm to be made is to be placed in normal operation of the system, and making a diaphragm having a contour identical with that of the area common to said luminous fields projected on said plane.

3. Method of making a diaphragm for association with view-taking and projection filters in a system of color cinematography on lenticular films, which method comprises the steps of positioning a view-taking optical system in front of an original film and a projecting optical system in front of a copy film, said optical systems each being placed at normal distance from the respective films, then replacing said films by opaque screens having small apertures in their peripheries, projecting stenopeic images by said optical systems through said apertures, recording the contours of said images in the plane where the diaphragm to be made is to be placed in normal operation of the color cinematographic system, and making a diaphragm of size corresponding to that of the unobturated area common to said images projected on said plane.

4. Method of making a diaphragm for inclusion in a system of color cinematography comprising at least one objective and at least one lenticulated film, which method comprises the steps of stenopeically projecting the boundaries of said objective through small apertures in the periphery of an opaque screen which is positioned in the plane where a picture on said film is to be placed in normal operation of the system and which has the same dimensions as said picture, recording the contours of the luminous fields projected from said apertures in the plane where the diaphragm to be made is to be placed in normal operation of the system, and making a diaphragm of size corresponding to that of the area common to said luminous fields projected on said plane.

ANDRÉ BLONDEL.